United States Patent
Ishikawa

[11] Patent Number: 5,947,516
[45] Date of Patent: Sep. 7, 1999

[54] SWING CONTROL APPARATUS FOR INDUSTRIAL VEHICLE

[75] Inventor: Kazuo Ishikawa, Kariya, Japan

[73] Assignee: Kabushiki Kaisha Toyoda Jidoshokki Seisakusho, Aichi-ken, Japan

[21] Appl. No.: 09/061,675

[22] Filed: Apr. 16, 1998

[30] Foreign Application Priority Data

Jul. 15, 1997  [JP]  Japan .................................. 9-189690

[51] Int. Cl.⁶ .............................. B60R 21/00; B66F 9/06
[52] U.S. Cl. ........................................... 280/755; 187/222
[58] Field of Search ................................... 280/755, 754, 280/124.112, 5.502, 5.508; 187/222

[56] References Cited

U.S. PATENT DOCUMENTS

| | | | |
|---|---|---|---|
| 4,093,091 | 6/1978 | Gregg et al. . | |
| 4,231,450 | 11/1980 | Hedtke et al. | 187/222 |
| 4,393,959 | 7/1983 | Acker | 280/755 |
| 4,511,974 | 4/1985 | Nakane et al. . | |
| 5,011,358 | 4/1991 | Andersen et al. | 187/222 |
| 5,029,892 | 7/1991 | Miwa | 280/5.502 |
| 5,087,068 | 2/1992 | Fukanaga et al. | 280/754 |
| 5,388,857 | 2/1995 | Wernimont et al. | 280/708 |
| 5,639,119 | 6/1997 | Plate et al. | 280/754 |
| 5,813,697 | 9/1998 | Bargenquast et al. | 280/754 |

FOREIGN PATENT DOCUMENTS

| | | |
|---|---|---|
| 0 465 838 | 1/1992 | European Pat. Off. . |
| 2 518 464 | 6/1983 | France . |
| 2 681 563 | 3/1993 | France . |
| 58-167215 | 10/1983 | Japan . |
| 2 264 689 | 9/1993 | United Kingdom . |
| 2 290 149 | 12/1995 | United Kingdom . |

OTHER PUBLICATIONS

Patent Abstracts of Japan, Publication No. 09142120, Published Jun. 3, 1997.
Patent Abstracts of Japan, Publication No. 58167215, Published Oct. 3, 1983.
Patent Abstracts of Japan, Publication No. 06191251, Published Jul. 12, 1994.
Patent Abstracts of Japan, Publication No. 04128521, Published Apr. 30, 1992.

*Primary Examiner*—Lanna Mai
*Assistant Examiner*—Jeff Restifo
*Attorney, Agent, or Firm*—Morgan & Finnegan, L.L.P.

[57] ABSTRACT

An industrial vehicle for conveying a load mounted thereon has a frame. A pair of front wheels is rotatably mounted on the frame. Each front wheel includes an outer tire and an inner tire. A rear axle is pivotally supported on the frame. A pair of rear wheels is rotatably mounted on the rear axle. A restriction apparatus is provided for selectively permitting and restricting the pivotal motion of the rear axle in accordance with the state of the carried load. A detecting device is provided for detecting a center of gravity of the vehicle. The restriction apparatus permits the pivotal motion of the rear axle when the center of gravity is located within a predetermined stable zone.

10 Claims, 9 Drawing Sheets

SWING CONTROL APPARATUS FOR INDUSTRIAL VEHICLE

BACKGROUND OF THE INVENTION

The present invention relates to a swing control apparatus for an industrial vehicle, such as a forklift, which controls vertical swinging of the axle of the vehicle.

Conventional forklifts are typically designed in such a manner that the rear axle is supported swingable in the vertical (rolling) direction with respect to the body frame to improve the riding comfort and traveling stability of the forklift. Further, the center of gravity of a forklift varies in accordance with various factors, such as the weight of the carried load and the lifted height of the carried load. As the rear axle swings, the center of gravity of the vehicle is likely to shift in the right and left (lateral) directions. This causes the vehicle to lose lateral stability. To avoid such a shortcoming, swinging of the axle of the conventional forklift is temporarily restricted such as when the forklift carries a heavy load, when the load is lifted to a high position, or when the forklift makes a fast turn.

For example, Japanese Unexamined Patent Publication No. 58-167215 discloses a mechanism for restricting swinging of the rear axle when the carried load on the fork becomes equal to or greater than a predetermined weight and when the elevated position of the carried load becomes higher than a predetermined position. Generally, the vehicle center of gravity must be kept in a stabilizing zone, which lies within a plane defined between the contact points of the ground and the four tires of the forklift, to maintain the vehicle in a stable state.

A heavier load weight or a higher load position causes the vehicle center of gravity to shift laterally out of the stabilizing zone. Therefore, in the forklift of the aforementioned publication, the swinging of the rear axle is restricted in accordance with the load weight and the load height to guarantee stability of the vehicle.

When the forklift carries long objects such as lumber, it is difficult to hold the object so that the object's center of gravity is substantially aligned with the center of the forklift. That is, the center of gravity of the object may shift away laterally from the center of the forklift. Furthermore, the object may swing in the roll direction of the forklift when being transported. This may also laterally shift the object's center of gravity. In other words, a wider stabilizing zone is advantageous for lateral stability of the vehicle during transportation of objects.

One simple way to achieve a wider center of gravity stabilizing zone is to use double tires on each front wheel. The employment of the double tires increases the lateral width of the stabilizing zone. That is, the width of each outer wheel contributes to an increase in the width of the stabilizing zone. The lateral stability of the front portion of the vehicle is enhanced as compared with an ordinary forklift, which employs single tires for the front wheels. Since the use of double tires significantly widens the stabilizing zone, the forklift can carry long loads, such as lumber, in a stable manner.

Figure 10:
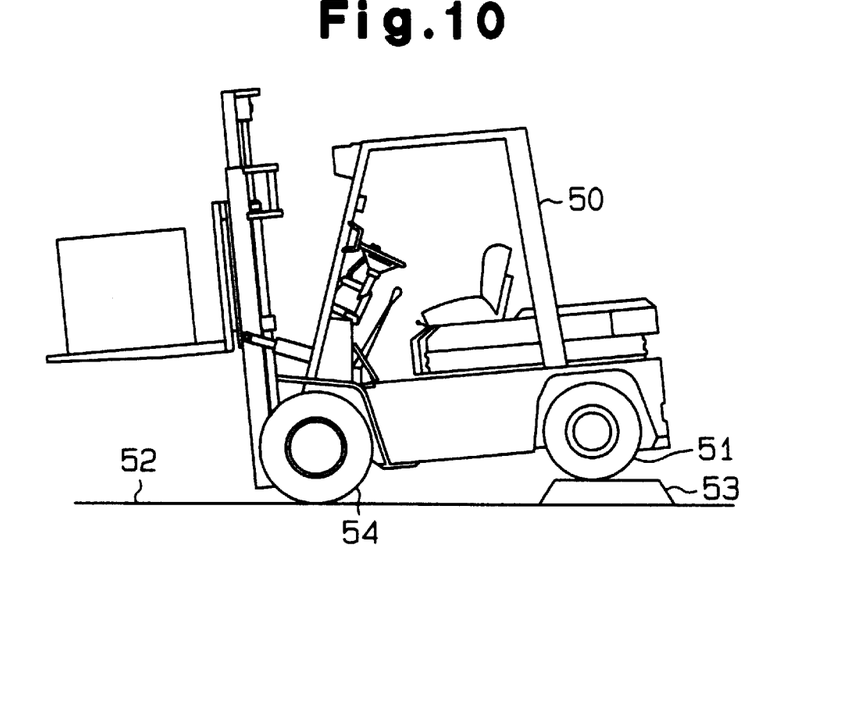
FIG. 10 is a schematic diagram depicting a conventional forklift with the rear axle under swing restriction.
Figure 11:
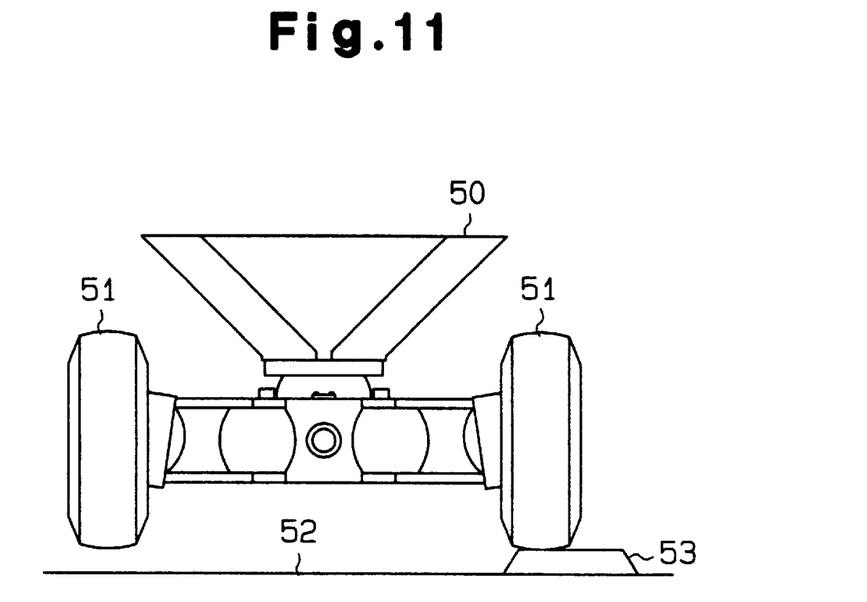
FIG. 11 is a schematic diagram showing the rear axle of the forklift of FIG. 10 under swing restriction.

A mast of a double-tire forklift may be tilted toward the front when carrying lumber or the like. Under such situation, the center of gravity of the vehicle moves toward the front portion of the vehicle, or to the front portion of the stabilizing zone. If swinging of the rear axle is restricted in this state, as shown in FIGS. 10 and 11, when rear wheels (51) of a forklift vehicle (50) ride over a protruding portion 53 on a ground 52, the rear portion of the vehicle 50 is elevated, while both front wheels 54 remain at the ground level. As a result, the vehicle 50 is tilted forward. This shifts the vehicle center of gravity to a further forward position and degrades the stability of the vehicle 50 in the forward direction.

SUMMARY OF THE INVENTION

Accordingly, it is an object of the present invention to provide a swing control apparatus for an industrial vehicle that suppresses the forward tilting of the vehicle to maintain longitudinal stability of the vehicle while also maintaining lateral stability when the rear wheels of the vehicle ride over a protruding portion with the vehicle center of gravity located at the front portion of the vehicle.

To achieve this object, an industrial vehicle for carrying a load includes a frame. A pair of front wheels are rotatably supported by the frame. Each front wheel is fitted with an outer wheel and an inner wheel. A rear axle is supported by the frame. The rear axle is pivotal with respect to the frame. A pair of rear wheels are rotatably mounted on the rear axle. A restriction apparatus selectively permits and restricts the pivotal motion of the rear axle in accordance with the carried load. A detecting device is provided for detecting a center of gravity of the vehicle. The restriction apparatus permits the pivotal motion of the rear axle when the center of gravity is located within a predetermined zone.

Other aspects and advantages of the invention will become apparent from the following description, taken in conjunction with the accompanying drawings, illustrating by way of example principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

The present invention will now be described referring to FIGS. 1 through 9.

Figure 2:
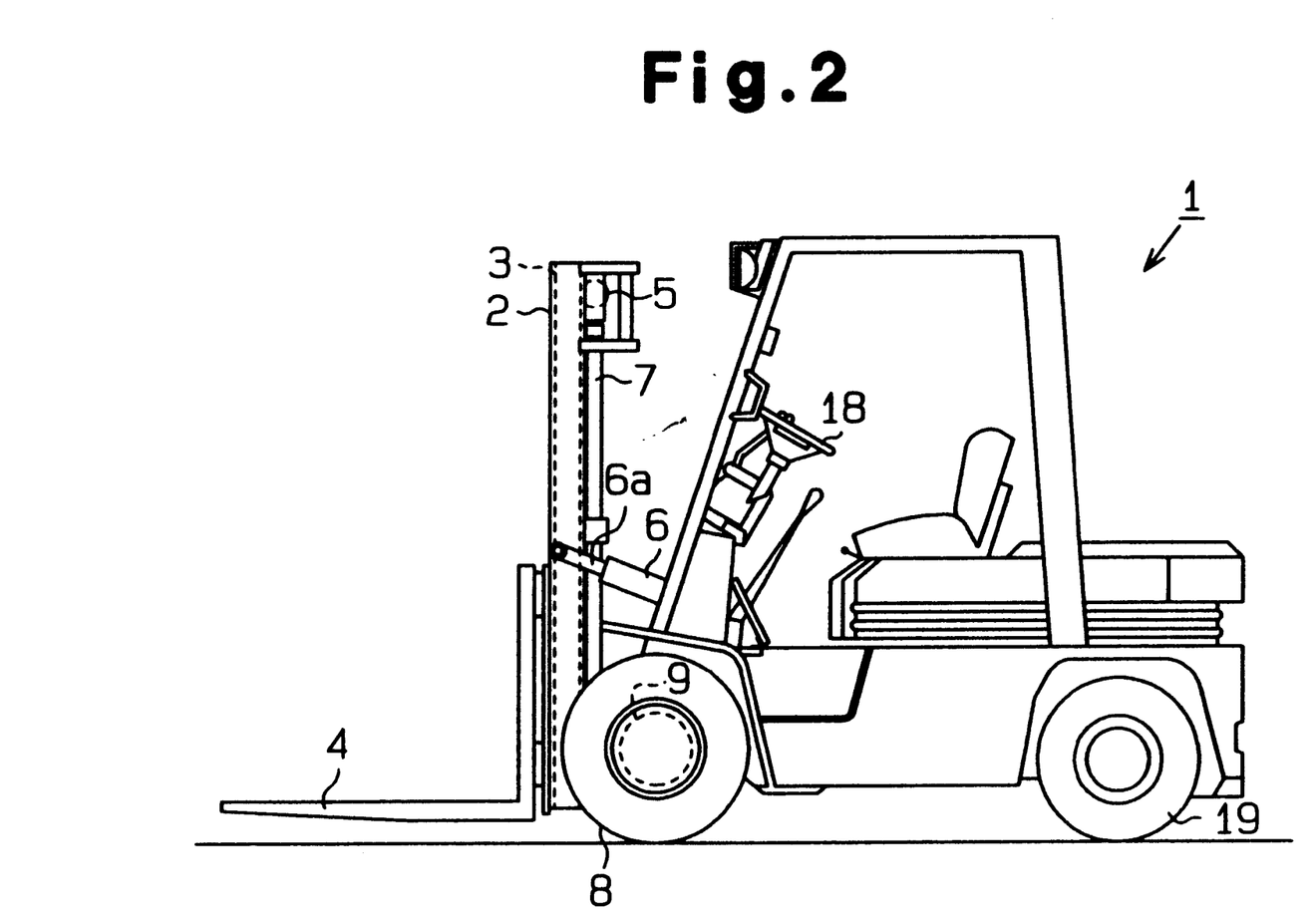
FIG. 2 is a side view showing the forklift of FIG. 1.

FIG. 2 shows an industrial vehicle, or four-wheel, front-drive, rear-steering forklift 1. Tiltably supported at the front portion of the base of the forklift 1 are outer masts 2 between which an inner mast 3 is supported in a vertically movable manner. A fork 4 is supported on the inner mast 3 in vertically movable manner. A sprocket wheel 5 is provided at the upper end of the inner mast 3. The upper ends of the outer masts 2 are connected to the fork 4 by a chain (not shown), which is meshed with the sprocket wheel 5. Coupled to the front portion of the base are tilt cylinders 6 whose piston rods 6a have distal ends connected to the outer masts 2. Lift cylinders 7 are located on the rear side of the outer masts 2, and the distal ends of their piston rods (not shown) are coupled to the upper end of the inner mast 3. Front wheels 8 located at the right and left front portions of the base are operably coupled to an engine via a differential gear 9 and a transmission system (not shown).

Figure 1:
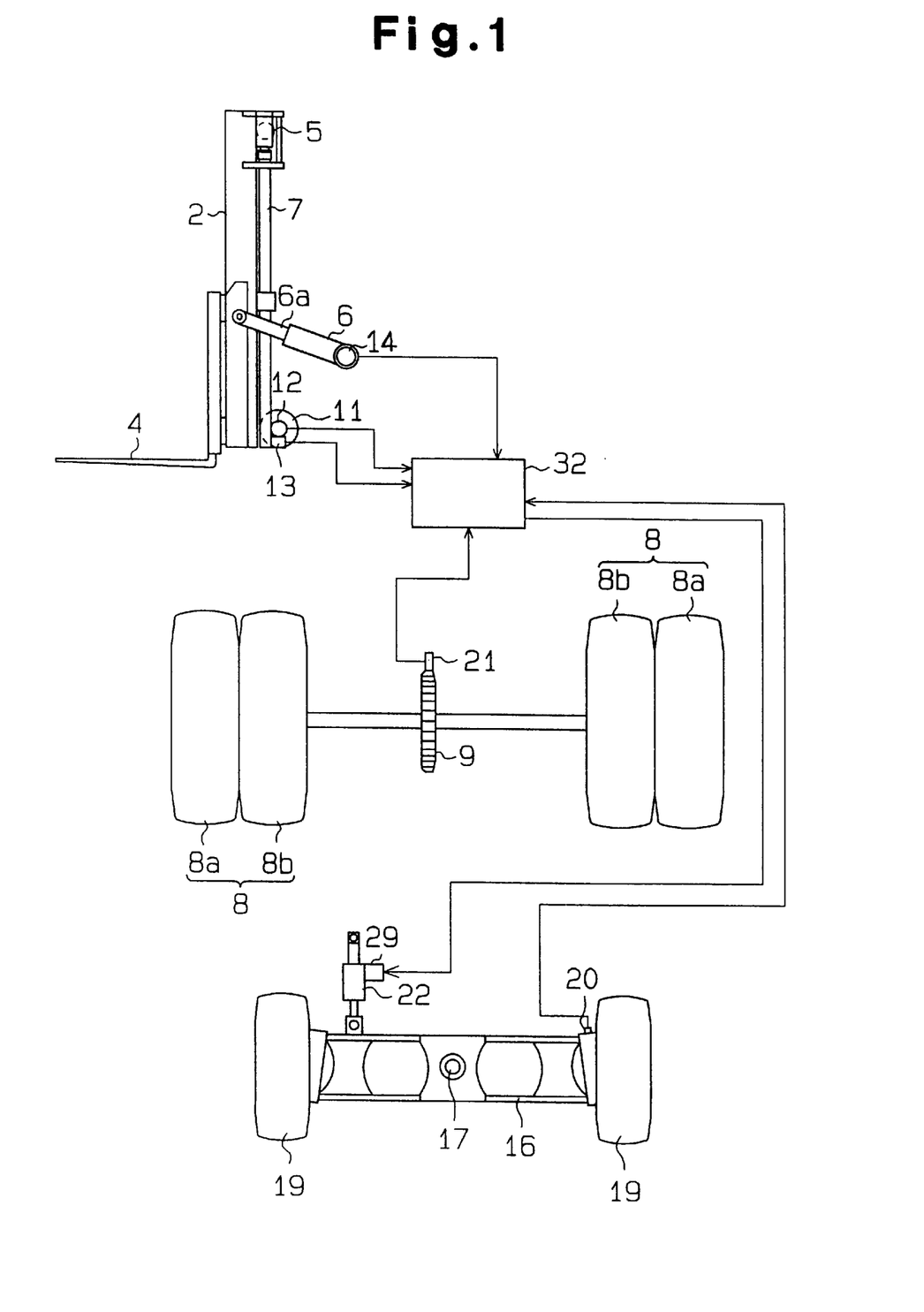
FIG. 1 is a schematic structural diagram showing a swing control apparatus for a forklift according to the present invention.

As shown in FIG. 1, provided at the lower portion of the outer mast 2 is a reel 11. A wire (not shown) having an end connected to the inner mast 3 is wound around the reel 11. The reel 11 is urged in a direction that winds the wire. The reel 11 is provided with a height sensor 12 for detecting the total number of rotations of the reel 11. Each lift cylinder 7 is provided with a weight sensor 13 for detecting the fluid pressure inside the cylinder 7 based on the weight of a load. Each tilt cylinder 6 is provided with a mast angle sensor 14 for detecting the tilt angle of the cylinder 6. An outer tire 8a and an inner tire 8b are mounted on each front wheel 8.

Figure 3:
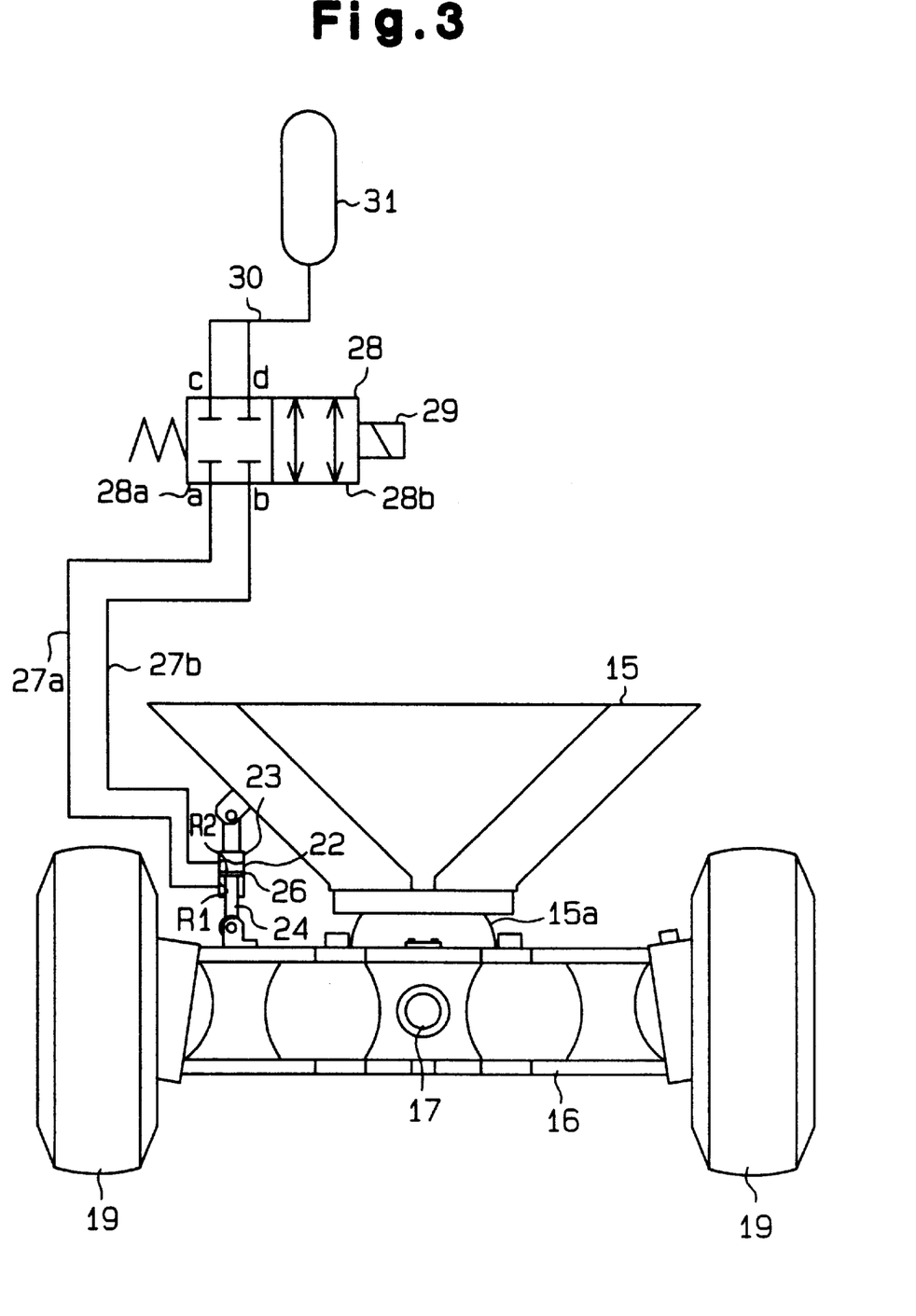
FIG. 3 is a schematic structural diagram showing a hydraulic circuit.

As shown in FIGS. 1 and 3, a rear axle 16 is supported pivotally about a center pin 17 in the vertical direction (roll direction), under the rear portion of a body frame 15. An elastic member 15a is arranged between the body frame 15 and the rear axle 16. Rotatable king pins (not shown) are supported on the right and left sides of the rear axle 16. Steered wheels 19, which are operably connected to a steering wheel 18 (shown in FIG. 2), are supported on the king pins so that the wheels 19 may be turned to steer the forklift.

As shown in FIG. 1, a steering angle sensor 20 is arranged on one side of the rear axle 16 to detect the turning amount of the associated king pin, or the wheel angle. Near the differential gear 9 is a vehicle speed sensor 21 which detects the number of rotations of the gear 9 per unit time.

As shown in FIG. 3, a multiple action type hydraulic cylinder 22 is provided between the body frame 15 and the rear axle 16. A cylinder tube 23 of the hydraulic cylinder 22 is coupled to the body frame 15. A piston rod 24 extending from the cylinder tube 23 has one end coupled to the rear axle 16. The other end of the piston rod 24 is secured to a piston 26, which partitions the cylinder tube 23 into a first oil room R1 and a second oil room R2. The first oil room R1 and the second oil room R2 are connected to an electromagnetic control valve 28 via conduits, or pipes 27a and 27b, respectively. The hydraulic cylinder 22 serves as a hydraulic damper for absorbing the swinging of the rear axle 16 with respect to the body frame 15. The hydraulic cylinder 22 also serves as a lock cylinder for restricting the swinging of the rear axle 16 with respect to the body frame 15.

In this embodiment, the electromagnetic control valve 28 is a normally closed, four-port, two-position switch valve. The four ports are denoted by the reference alphabets of "a", "b", "c", and "d". A block position 28a and a communication position 28b are defined in the electromagnetic control valve. When an electromagnetic solenoid 29 is deexcited, the electromagnetic control valve 28 is switched to the block position 28a to block the flow of the hydraulic fluid between the ports a and c and between the ports b and d. When the electromagnetic solenoid 29 is excited, the electromagnetic control valve 28 is switched to the communication position 28b to establish communication between the ports a and c and between the ports b and d. The pipe 27a is connected to the port a of the electromagnetic control valve 28, while the pipe 27b is connected to the port b. An accumulator 31 is connected via a pipe 30 to the ports c and d. A control unit 32 is provided on the body frame 15.

The electric structure of the swing control apparatus will now be described.

Figure 4:
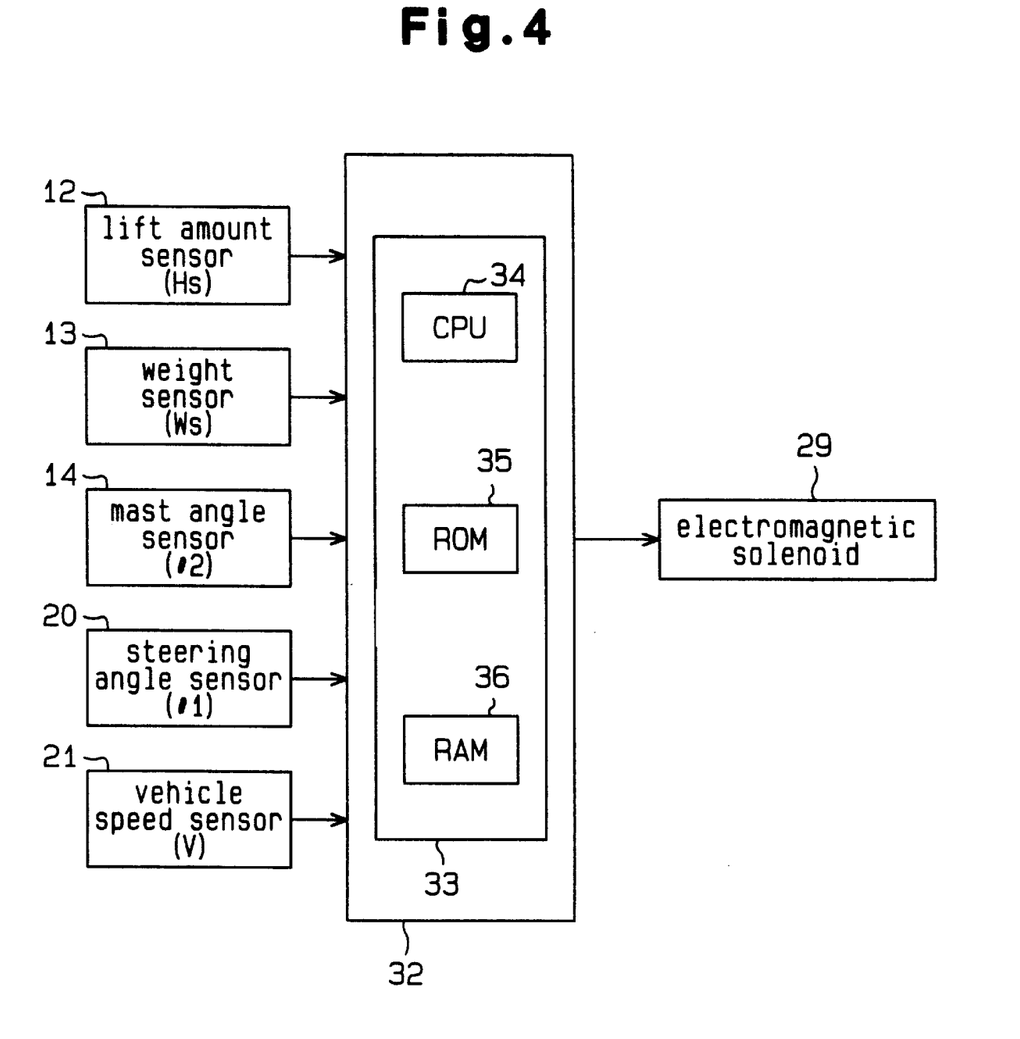
FIG. 4 is an electric block diagram showing a control unit.

As shown in FIG. 4, the height sensor 12, the weight sensor 13, the mast angle sensor 14, the steering angle sensor 20 and the vehicle speed sensor 21 are electrically connected to the control unit 32 to which the electromagnetic solenoid 29 is electrically connected.

The steering angle sensor 20 sends a steering angle signal to the control unit 32 based on the turning amount of the king pin that corresponds to the steering angle $\theta1$ of the rear wheels 19. The vehicle speed sensor 21 sends a vehicle speed signal to the control unit 32 based on the number of rotations of the differential gear 9 that corresponds to the vehicle speed V. The height sensor 12 sends a height signal to the control unit 32 based on the total number of rotations of the reel 11 that corresponds to the height Hs of the fork 4. The weight sensor 13 sends a weight signal to the control unit 32 based on the hydraulic pressure that corresponds to the weight Ws of the load. The mast angle sensor 14 sends a mast angle signal to the control unit 32 based on the tilt angle of the tilt cylinder 6 that corresponds to the tilt angle $\theta2$ of the outer mast 2.

As shown in FIG. 4, the control unit 32 has a microcomputer 33 which includes a central processing unit (CPU) 34, a read only memory (ROM) 35 and a random access memory (RAM) 36. The control unit 32 further has an electromagnetic valve drive circuit (not shown) which receives and outputs signals for driving the electromagnetic solenoid. A plurality of A/D converters (not shown), which are respectively connected to the individual sensors 12, 13, 14, 20 and 21, convert analog signals sent from the associated sensors to digital signals and then sends the digital signals to the control unit 32.

In this embodiment, the height sensor 12, the weight sensor 13, the mast angle sensor 14 and the control unit 32 constitute a gravitational center detector, and the hydraulic cylinder 22, the electromagnetic control valve 28 and the control unit 32 constitute a swing restriction device. Further, the control unit 32 constitutes a gravitational center determining device and a swing restriction prohibition device.

The ROM 35 stores a control program for executing a swing control process which temporarily restricts the swinging of the rear axle 16. The swing control process is executed to prevent excessive swinging of the rear axle 16 with respect to the body frame 15 and stabilize the vehicle. The ROM 35 also stores a set value G0 of the lateral acceleration, a set value y0 of the rate of change in the yaw rate, a set value W0 of the weight, and a set value H0 of the lifted height. The individual set values G0, y0, W0 and H0 are predetermined reference values that are compared with the associated detection values when executing the swing restriction control. The RAM 36 temporarily stores the results of operations performed by the CPU 34.

The CPU 34 is activated when the ignition key (not shown) is switched on. Based on the control program, the CPU 34 continuously supplies excitation current to the electromagnetic control valve 28 via the electromagnetic valve drive circuit to activate the electromagnetic control valve 28. The CPU 34 receives the vehicle speed signal, the steering angle signal, the height signal, the weight signal, and the mast angle signal via the respective A/D converters, and repeatedly executes the swing control process based on these signals for every predetermined time period.

In the swing control process, the CPU 34 computes the steering angle θ1 from the steering angle signal, and computes the turning radius r of the vehicle from the steering angle θ1. The CPU 34 also calculates the vehicle speed V from the vehicle speed signal. Using the computed steering angle θ1 and vehicle speed V, the CPU 34 calculates the lateral acceleration Gs from the following equation (1).

$$Gs = V^2/r \qquad (1)$$

Then, the CPU 34 determines if the computed lateral acceleration Gs is equal to or greater than the set value G0. When the lateral acceleration Gs is equal to or greater than the set value G0, the CPU 34 determines that the turning state of the vehicle degrades the lateral stability of the vehicle. Thus, the CPU 34 stops outputting the excitation current and restricts the swinging of the rear axle 16. The set value G0 of the lateral acceleration Gs is set based on the weight of the load and the lifted height so that the vehicle carrying the load can stably turn.

The CPU 34 computes the rate of change in yaw rate Δω/ΔT from an equation (2) described below using the steering angle θ1 calculated from the steering angle signal, the turning radius r calculated from the steering angle θ1 and the vehicle speed V calculated from the vehicle speed signal.

$$\Delta\omega/\Delta t = V \times \Delta(1/r)/\Delta T \qquad (2)$$

In the equation, Δ(1/r) is the amount of change (deviation) of the reciprocal 1/r of the turning radius r per predetermined time ΔT (e.g., several scores of milliseconds). The deviation Δ(1/r) is computed from an equation Δ(1/r)=|1/r−1/rb| (where rb is the turning radius taken a predetermined time ΔT earlier) using data of several previous steering angles θ1 (once in the predetermined time ΔT), the steering angle data θb taken a predetermined time ΔT earlier and the reciprocal of the turning radius that is determined from the steering angle data θb.

The CPU 34 determines if the calculated rate of change in yaw rate Δω/Δt is equal to or greater than the set value y0. When the rate of change in yaw rate Δω/Δt is equal to or greater than the set value y0, the CPU 34 determines that the turning state of the vehicle degrades the lateral stability of the vehicle. Then, the CPU 34 stops supplying the excitation current to restrict the swinging of the rear axle 16. The set value y0 of the rate of change in yaw rate Δω/Δt is set based on the running tests and theoretical computation. In this embodiment, the lateral acceleration Gs and the rate of change in yaw rate Δω/Δt are equivalent to detection values corresponding to the turning state of the vehicle.

The CPU 34 computes the lifted height Hs from the height signal and determines if the lifted height Hs is equal to or greater than the set value H0. When the lifted height Hs is equal to or greater than the set value H0, the CPU 34 determines that the vertical position of the gravitational center of the vehicle Pg at the lifted height Hs degrades the lateral stability of the vehicle when the rear axle 16 swings. Then, the CPU 34 stops supplying the excitation current to restrict the swinging of the rear axle 16.

The CPU 34 computes the weight Ws from the weight signal and determines if the weight Ws is equal to or greater than the set value W0. When the weight Ws is equal to or greater than the set value W0, the CPU 34 determines that the vertical position of the vehicle's gravitational center Pg when carrying a load degrades the lateral stability of the vehicle if the rear axle 16 swings. Then, the CPU 34 stops supplying the excitation current to restrict the swinging of the rear axle 16.

In this embodiment, if the lifted height Hs is equal to or greater than the set value H0 or if the weight Ws is equal to or greater than the set value W0, swinging of the rear axle 16 is restricted in accordance with the state of the load.

The CPU 34 computes the mast angle θ2 from the mast angle signal. Based on the mast angle θ2, the lifted height Hs computed from the height signal and the weight Ws computed from the weight signal, the CPU 34 estimates the longitudinal position of the vehicle's gravitational center Pg with respect to a center line Lc extending along a horizontal plane, as shown in FIG. 5.

The gravitational center Pg of the vehicle will now be discussed.

Figure 5:
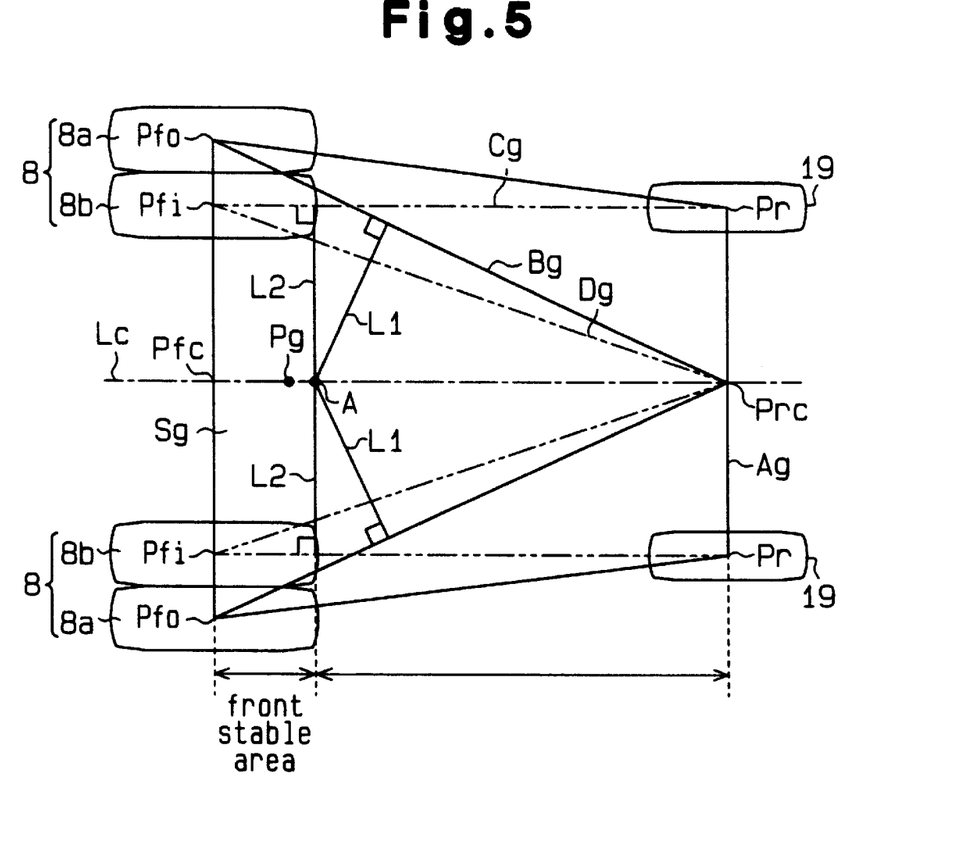
FIG. 5 is a schematic diagram showing a gravitational-center stable zone, a frontward stable zone, and the gravitational center of a vehicle.

FIG. 5 shows various gravitational-center stable zones Ag, Bg, Cg and Dg, which are defined between contact points of the ground with the front wheels 8 and the rear wheels 19 in a double-tire vehicle and a single-tire vehicle. In FIG. 5, the inner tire 8b of the double-tire vehicle corresponds to the front wheel of the single-tire vehicle.

The center line Lc of the double-tire vehicle and the single-tire vehicle connects a point Pfc, which lies in the center of ground points Pf0 where the right and left outer wheels 8a contact the ground, to a point Prc, which lies in the center between the ground points Pr where the right and left rear wheels 19 contact the ground.

For the double-tire vehicle, the gravitational-center stable zone defined on a horizontal plane with the rear axle 16 under swing restriction is a trapezoidal area Ag which is formed by connecting the ground points pfo of both outer wheels 8a and the ground points Pr of both rear wheels 19. When the vehicle's gravitational center Pg lies in this gravitational-center stable zone Ag with the rear axle 16 under swing restriction, the lateral stability of the vehicle is maintained. The gravitational-center stable zone on a horizontal plane with the rear axle 16 free to swing is a triangular area Bg which is formed by connecting the ground points pfo of both outer wheels 8a and the point Pc lying at the center between the ground points Pr of both rear wheels 19. When the vehicle's gravitational center Pg lies in this gravitational-center stable zone Bg with the rear axle 16 free to swing, the lateral stability of the vehicle is maintained.

For the single-tire vehicle, the gravitational-center stable zone with the rear axle 16 under swing restriction is a trapezoidal area Cg (shown in FIG. 5 as a rectangle for the sake of convenience) which is formed by connecting the ground points pfi of both single front wheels 8b and the ground points Pr of both rear wheels 19. The gravitational-center stable zone with the rear axle 16 free to swing is a triangular area Dg which is formed by connecting the ground points pfi of both single front wheels 8b and the point Pc lying at the center between the ground points Pr of both rear wheels 19.

The outer wheels 8a widen the gravitational-center stable zones Ag and Bg of the double-tire vehicle, which are defined when the swinging of the rear axle 16 is restricted and when the swinging of the rear axle 16 is permitted, in the lateral direction of the vehicle in comparison to the gravitational-center stable zones Cg and Dg of the single-tire vehicle.

Whether or not the vehicle is actually stable in the lateral direction can be expressed by the minimum distance between the vehicle's gravitational center Pg on the center line Lc and the outer boundary of each gravitational-center stable zone. That is, this minimum distance represents how difficult it is for the vehicle's gravitational center Pg to move beyond each gravitational-center stable zone when the vehicle tilts in the lateral direction while the rear axle 16 is under swing restriction or in a swing free state. If the vehicle's gravitational center Pg lies at a certain point A, as shown in FIG. 5, the length of a line extending from the point A (vehicle gravitational center Pg) and perpendicularly intersecting the outer boundary of the gravitational-center stable zone Bg, i.e., the minimum distance L1, indicates the lateral stability of the double-tire vehicle with the rear axle 16 in a swing free state. Likewise, the length of a line extending from the point A (vehicle's gravitational center Pg) and perpendicularly intersecting the outer boundary of the gravitational-center stable zone Cg, i.e., the minimum distance L2, indicates the lateral stability of the single-tire vehicle with the rear axle 16 under swing restriction.

This implies that when the point A lies at the position where the minimum distance L1 with the rear axle 16 of the double-tire vehicle in a swing free state becomes equal to the minimum distance L2 with the rear axle 16 of the single-tire vehicle under swing restriction, and the vehicle's gravitational center Pg lies frontward of the vehicle with respect to the point A, the lateral stability of the vehicle becomes greater when the rear axle 16 of the double-tire vehicle undergoes swing restriction than when the rear axle of the single-tire vehicle is under swing restriction.

The front stable zone Sg is set in front of the point A or frontward of the gravitational-center stable zone Ag, when the vehicle's gravitational center Pg on the center line L1 on a horizontal plane lies in this front stable zone Sg. Thus, the sufficient lateral stability of the vehicle is maintained without restricting the swinging of the rear axle 16. The CPU 34 determines if the vehicle's gravitational center Pg on the center line Lc is located in the front stable zone Sg.

When the vehicle's gravitational center Pg on the center line Lc lies in the front stable zone Sg, the CPU 34 determines that the lateral stability of the vehicle is sufficient even if the rear axle 16 is set in a swing free state. In this case, the CPU 34 does not restrict the swinging of the rear axle 16 even if the swinging of the rear axle 16 should be restricted when the lifted height Hs is equal to or greater than the set value H0 or when the weight Ws is equal to or greater than the set value W0. In this control, the CPU 34 tries to secure the longitudinal stability of the vehicle in a load carrying situation with the rear axle 16 set free to swing, rather than improving the lateral stability of the vehicle based on the load state.

Figure 7:
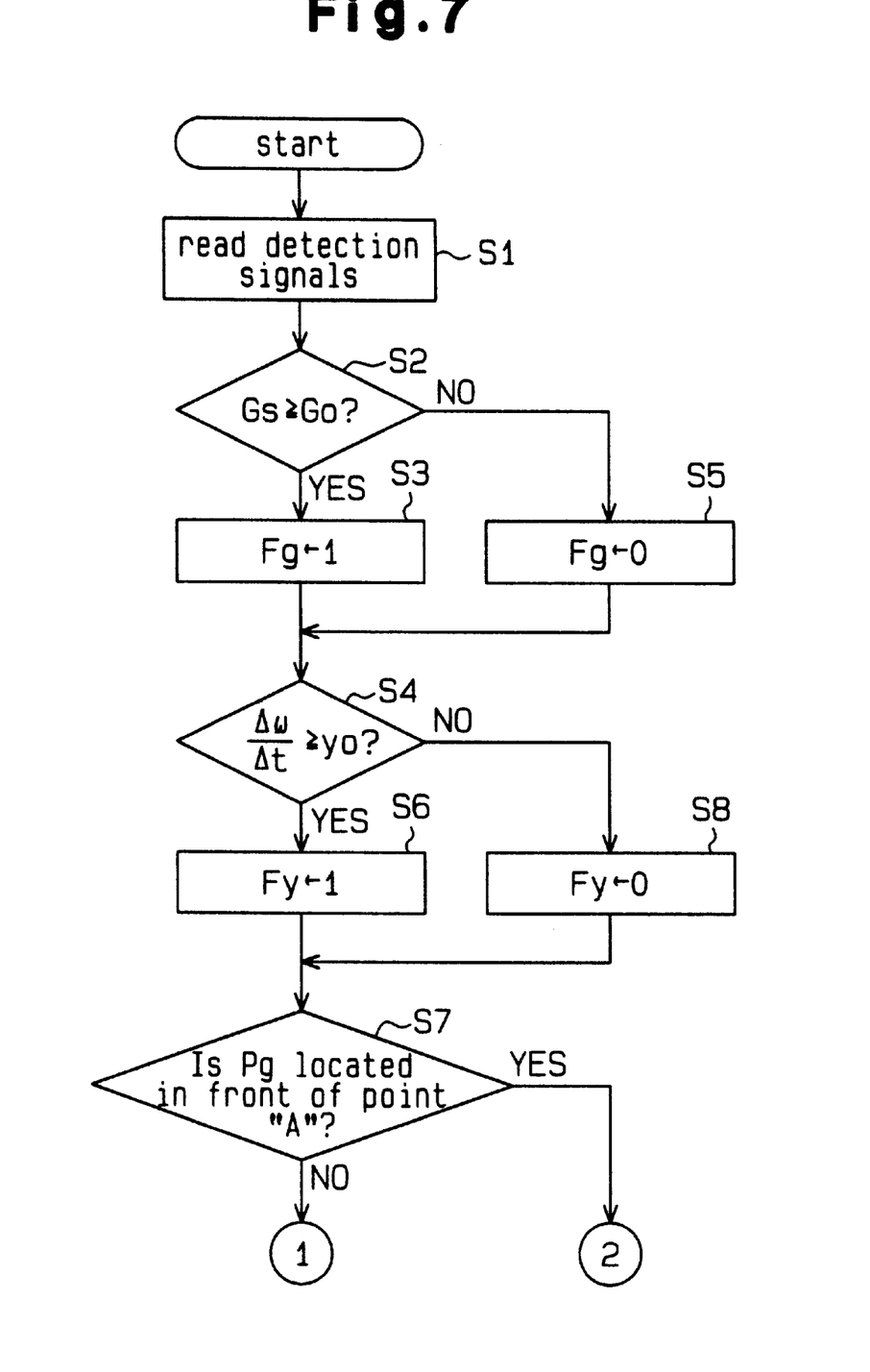
FIG. 7 is a flowchart of a swing control process.
Figure 8:
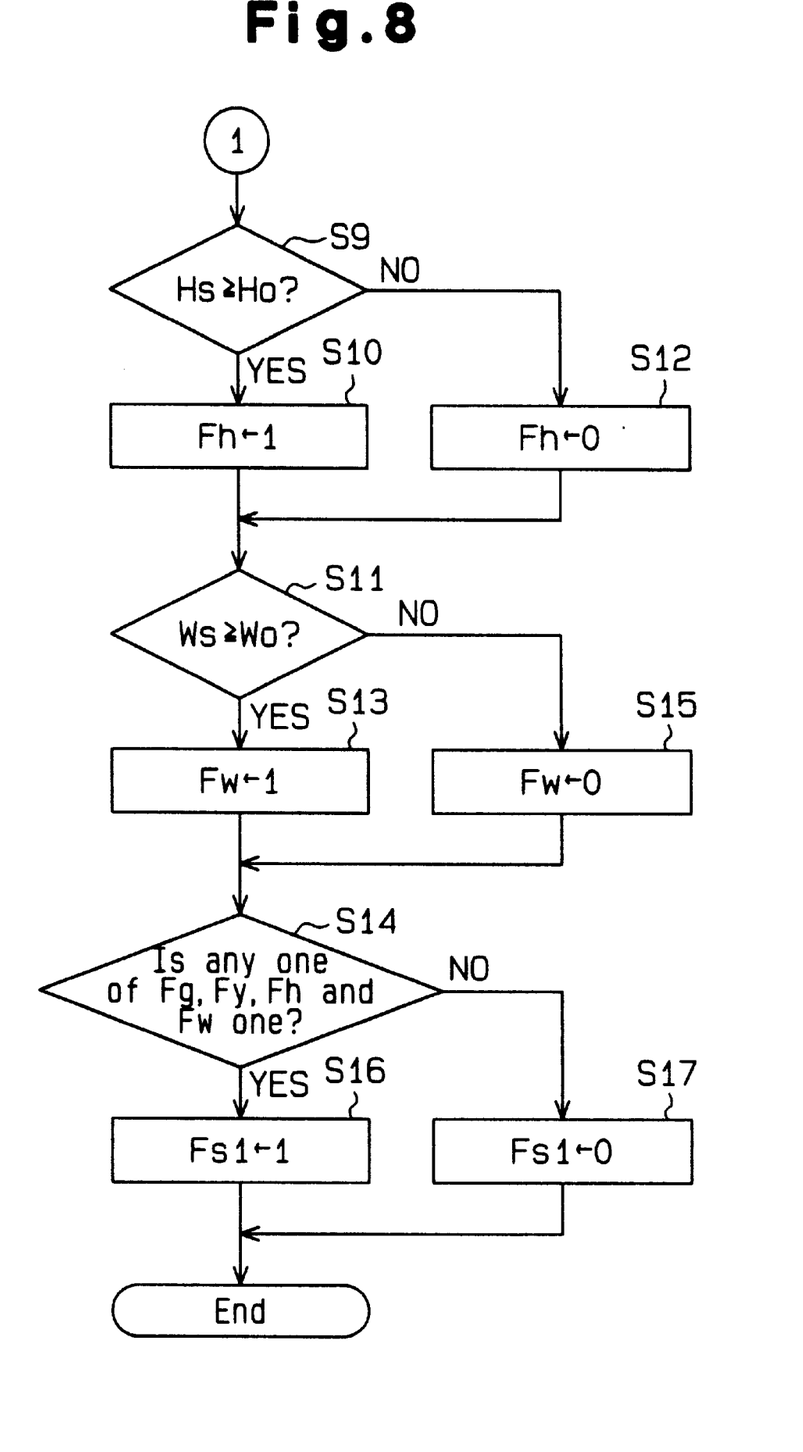
FIG. 8 is a flowchart of the swing control process.

The operation of the swing control apparatus will be explained below with reference to the flowcharts shown in FIGS. 7 to 9.

When entering the swing control process, the CPU 34 reads the detection signals from the sensors 12–14, 20, and 21 in step 1 (hereinafter expressed only as "S1" and the same will be applied to other steps).

In S2, the CPU 34 computes the lateral acceleration Gs based on the vehicle speed signal and the steering angle signal, and determines if the computed lateral acceleration Gs is equal to or greater than the set value G0. When determining in S2 that the lateral acceleration Gs is equal to or greater than the set value G0, the CPU 34 sets "1" to the flag Fg in S3 and then proceeds to S4. When determining in S2 that the lateral acceleration Gs is less than the set value G0, the CPU 34 sets "0" to the flag Fg before proceeding to S4.

In S4, the CPU 34 computes the rate of change in yaw rate $\Delta\omega/\Delta t$ based on the vehicle speed signal and the steering angle signal, and determines if the computed rate of change in yaw rate $\Delta\omega/\Delta t$ is equal to or greater than the set value y0.

When determining in S4 that the computed rate of change in yaw rate $\Delta\omega/\Delta t$ is equal to or greater than the set value y0, the CPU 34 proceeds to S6 and sets "1" to the flag Fy. The CPU 34 then proceeds to S7. When determining in S4 that the computed rate of change in yaw rate $\Delta\omega/\Delta t$ is smaller than the set value y0, the CPU 34 proceeds to S8 and sets "0" to the flag Fy. The CPU 23 then proceeds to S7.

In S7, the CPU 34 estimates the position of the vehicle's gravitational center Pg on the center line Lc based on the height signal, the weight signal and the mast angle signal, and determines if the estimated vehicle's gravitational center Pg lies frontward of the point A, i.e., if the gravitational center Pg lies in the front stable zone Sg. When determining in S7 that the vehicle's gravitational center Pg is not located in the front stable zone Sg, the CPU 34 executes S9, which is shown in FIG. 8.

In S9, the CPU 34 computes the lifted height Hs based on the height signal, and determines if the computed lifted height Hs is equal to or greater than the set value H0. When determining in S9 that the computed lifted height Hs is equal to or greater than the set value H0, the CPU 34 proceeds to S10 and sets "1" to the flag Fh. The CPU 3 then proceeds to S11. When determining in S9 that the computed lifted height Hs is smaller than the set value H0, the CPU 34 proceeds to S12 and sets "0" to the flag Fh before proceeding to S11.

In S11, the CPU 34 computes the weight Ws based on the weight signal, and determines if the computed weight Ws is equal to or greater than the set value W0. When determining that the computed weight Ws is equal to or greater than the set value W0, the CPU 34 sets "1" to the flag Fw in S13 and proceeds to S14. When determining in S11 that the computed weight Ws is smaller than the set value W0, the CPU 34 sets "0" to the flag Fw in S15 before executing S14.

In S14, the CPU 34 determines if at least one of the flags Fg, Fy, Fh and Fw is set at "1". When any one of the flags Fg, Fy, Fh and Fw is set at "1", the CPU 34 sets "1" to the flag Fsl in S16. When all the flags Fg, Fy, Fh and Fw are "0" in S14, the CPU 34 sets "0" to the flag Fsl in S17 and then terminates this process.

After execution of the swing control process when carrying out the main program, the CPU 34 keeps supplying the excitation current if the flag Fsl is "0" and stops supplying the excitation current if the flag Fsl is "1". When any one of the lateral acceleration Gs, the rate of change in yaw rate $\Delta\omega/\Delta t$, the lifted height Hs and the weight Ws is equal to or greater than the associated set value G0, y0, H0 or W0, the electromagnetic control valve 28 is switched to the block position 28a from the communication position 28b to prohibit the flow of the hydraulic fluid between both oil rooms R1 and R2 in the hydraulic cylinder 22. This restricts the actuation of the hydraulic cylinder 22 and prohibits the swinging of the rear axle 16 with respect to the body frame 15. Thus, the vehicle's state during turning is determined based on the lateral acceleration Gs or the rate of change in yaw rate $\Delta\omega/\Delta t$. When the determination result shows that the lateral stability of the vehicle will get lower, the swinging of the rear axle 16 is restricted to guarantee stability.

When the transportation state of the carried load is determined based on the present lifted height Hs or weight Ws and when there is a possibility that the lateral stability of the vehicle may decrease, the swinging of the rear axle 16 is restricted to guarantee the lateral stability of the vehicle. In such state, even if the rear wheels 19 ride over a bump on a road as the forklift travels, the rear axle 16 does not swing. Thus, the rear portion of the vehicle is elevated by the bump. As a result, the vehicle tilts forward. However, since the vehicle's gravitational center Pg on the center line Lc along a horizontal plane is located rearward of the point A or in the rear portion of the gravitational-center stable zone Bg, the vehicle maintains longitudinal stability.

Figure 9:
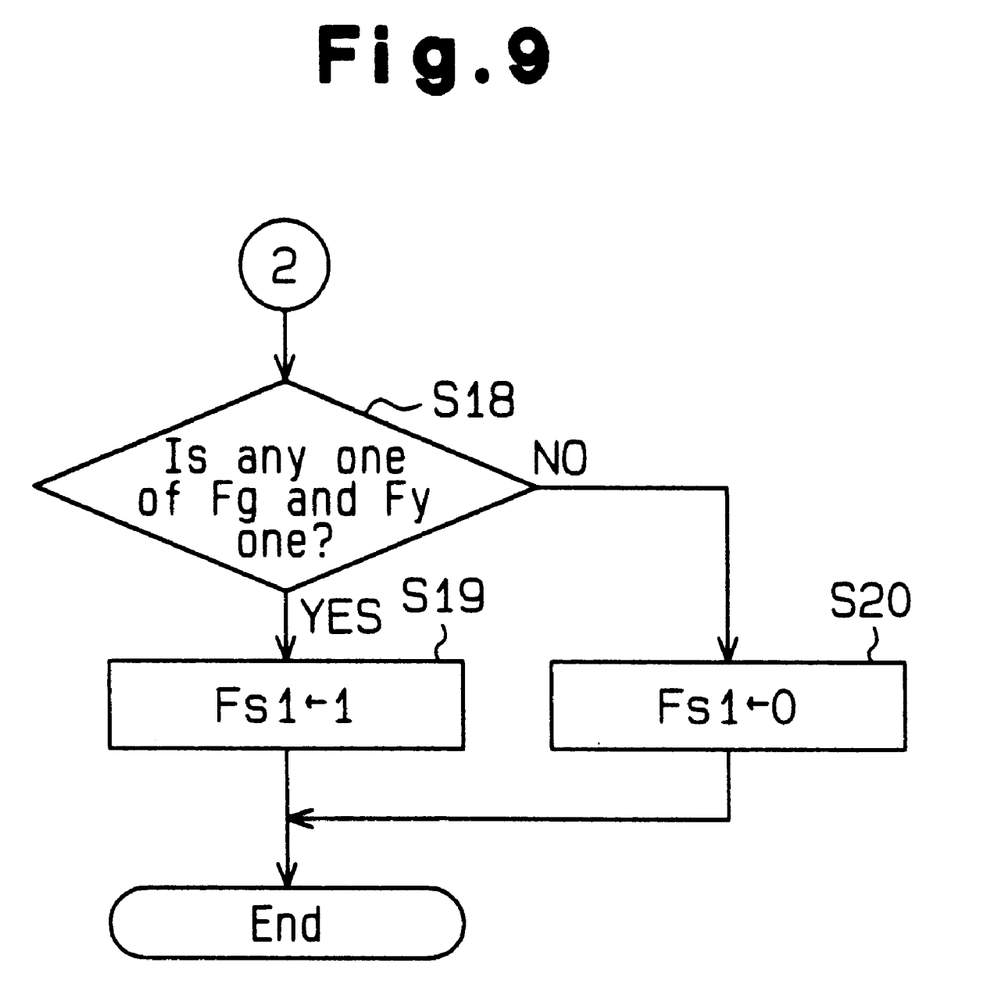
FIG. 9 is a flowchart of the swing control process.

When it is determined in S7 that the vehicle's gravitational center Pg lies in the front stable zone Sg, the CPU 34 proceeds to S18, which is shown in FIG. 9. In S18, the CPU 34 determines if either one of the flag Fg and the flag Fy is "1". When either the flag Fg or the flag Fy is "1", the CPU 34 sets "1" to the flag Fsl in S19. When both flags Fg and Fy are "0" in S18, the CPU 34 sets "0" to the flag Fsl in S20.

After execution of the swing control process when carrying out the main program, the CPU 34 stops supplying the excitation current when the flag Fsl is "1" and the CPU 34 keeps supplying the excitation current when the flag Fsl is "0". If the vehicle's gravitational center Pg on the center line Lc on a horizontal plane lies in the front stable zone Sg, therefore, when and only when the lateral acceleration Gs is equal to or greater than the set value G0 or when the rate of change in yaw rate $\Delta\omega/\Delta t$ is equal to or greater than the y0, the actuation of the hydraulic cylinder 22 is prohibited to restrict the swinging of the rear axle 16. That is, even if the lifted height Hs is equal to or greater than the H0 or even if the weight Ws is equal to or greater than the set value W0, the rear axle 16 is set in a swing free state both when the lateral acceleration Gs is smaller than the set value G0 and when the rate of change in yaw rate $\Delta\omega/\Delta t$ is smaller than the set value y0.

Figure 6:
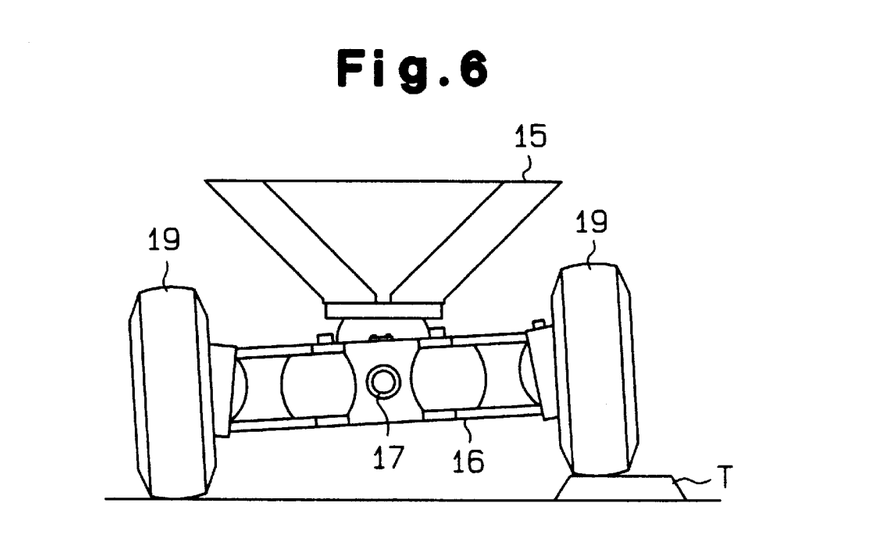
FIG. 6 is a schematic diagram showing the rear axle and the body.

When the vehicle's gravitational center Pg on the center line Lc on a horizontal plane lies in the front stable zone Sg where the lateral stability of the vehicle is high without restricting the swinging of the rear axle 16, the swinging of the rear axle 16 is set free to swing even if the weight Ws is equal to or greater than the W0 or the lifted height Hs is equal to or greater than the H0. When the rear wheels 19 ride over a bump T when traveling along a road, as shown in FIG. 6, the rear axle 16 swings with both front wheels 8 on the ground. Accordingly, the maximum elevated amount of the rear portion of the vehicle does not increase, thus suppressing the forward tilting of the vehicle.

As apparent from the detailed description given above, the swing control apparatus of this embodiment has the following advantages.

(a) In a vehicle which front wheels 8 employ double tires and which rear axle 16 is swingable, the swinging of the rear axle 16 is restricted in accordance with the weight Ws or the lifted height Hs of the load carried by the fork 4. This secures the lateral stability of the vehicle. When the vehicle's gravitational center Pg on the center line Lc is located in the front stable zone Sg in the gravitational-center stable zone Ag, swing restriction of the rear axle 16 is not carried out in accordance with the weight Ws and the lifted height Hs.

When the lateral stability of the vehicle is sufficient and the swinging of the rear axle 16 need not be restricted, swing restriction of the rear axle 16 is not based on the lifted height Hs or the weight Ws. Therefore, if the rear wheels 19 ride over the bump T with the vehicle's gravitational center Pg lying at the front portion of the vehicle as a result of the vehicle carrying a heavy load or as a result of a tilted mast, the rear axle 16 swings with both front wheels 8 contacting the ground. This suppresses the forward tilting of the vehicle. This maintains the lateral stability of the vehicle as well as the longitudinal stability of the vehicle.

(b) The vehicle's gravitational center Pg on the center line Lc is predicted based on the weight Ws, the lifted height Hs and the mast angle $\theta 2$. This enhances the accuracy of positional estimation in comparison to when the vehicle's gravitational center Pg is estimated from only the weight Ws and the lifted height Hs. This permits swinging of the rear axle 16 when the vehicle's gravitational center Pg lies in the front stable zone Sg, and suppresses forward tilting of the vehicle when the rear wheels 19 ride over a bump.

(c) As the hydraulic cylinder 22 for swing restriction serves as a damper for absorbing the swing action, it is unnecessary to provide a separate shock absorber like a hydraulic damper. This provides more space and facilitates the installation of the hydraulic cylinder 22.

(d) The present invention is applied to a double-tire forklift which is frequently used with the vehicle's gravitational center lying at the front side of the vehicle and whose rear axle 16 is supported in a swingable manner. Therefore, the lateral stability of the double-tire forklift when carrying a heavy load lifted up high is guaranteed and the forward tilting of the forklift when the rear wheels 19 ride over a bump T is suppressed thus guaranteeing longitudinal stability.

(e) Since the electromagnetic control valve 28 is a normally closed type valve, the actuation of the hydraulic cylinder 22 is restricted when the control unit 32 fails. When the control unit 32 fails, the swinging of the rear axle 16 is restricted so that the load may be carried to a certain location in a stable state before repairing the control unit 32.

It should be apparent to those skilled in the art that the present invention may be embodied in many other specific forms without departing from the spirit or scope of the invention. Particularly, it should be understood that the invention may be embodied in the following forms.

In the preferred and illustrated embodiment, the front stable zone Sg extends frontward from the point A where the minimum distance L1 from the vehicle's gravitational center Pg to the boundary of the gravitational-center stable zone Bg is equal to the minimum distance L2 from the vehicle's gravitational center Pg to the boundary of the gravitational-center stable zone Cg. However, the start point of the front stable zone Sg may be set in front of the point A to cope with erroneous detections of the sensors. In such case, the swinging of the rear axle 16 is not restricted if the actual vehicle's gravitational center Pg lies in the front stable zone Sg. This guarantees the longitudinal stability of the vehicle.

The swing control apparatus may further include a swing restriction device for restricting the swinging of the rear axle 16 under a predetermined swing restriction condition based on the load state, a gravitational center detecting device for detecting the vehicle's gravitational center relative to the vertical direction of the vehicle when lifting loads, and a gravitational center determining device for determining the influence of the forward tilting of the vehicle on the vehicle's gravitational center. In this case, when the gravitational center determining device determines that the vehicle's gravitational center relative to the vertical direction is equal to or greater than the restriction height, the swing restriction of the rear axle 16 carried out by the swing restriction device is prohibited. The gravitational center detecting device may include the height sensor 12, the weight sensor 13, and the mast angle sensor 14, while the swing restriction device and the gravitational center determining device may include the control unit 32.

Accordingly, the swinging of the rear axle is permitted when the vehicle's gravitational center relative to the vertical direction lies higher than the restriction height and when there is a possibility that the vehicle's gravitational center may shift forward if the rear wheels ride over a bump that tilts the vehicle with the rear axle under swing restriction. Thus, when the rear wheels ride over a bump that tilts the vehicle with the vehicle's gravitational center lying on the front side of the vehicle, the lateral stability of the vehicle is maintained and the forward tilting of the vehicle is suppressed. This guarantees the longitudinal stability of the vehicle using a simple control method.

The restriction control device may be designed to restrict the swinging of the rear axle 16 only under a predetermined swing restriction condition based on at least one of the detection values corresponding to the turning state of the vehicle with front double-tire wheels, such as the vehicle speed V, the steering angle θ1, the lateral acceleration Gs and the rate of change in yaw rate Δω/Δt. With this structure, under the circumstance where the lateral stability of the vehicle is not reduced by the turning of the vehicle, sufficient lateral stability of the vehicle can be secured even when swing restriction should be conducted based on the parameters indicating the load carrying state, such as the lifted height Hs, the weight Ws and the mast angle θ2, so that the rear axle 16 is allowed to swing. Even if the rear wheels 19 go over a bump T when the vehicle's gravitational center Pg lies in the front portion of the gravitational-center stable zone Bg which does not provide sufficient space for the longitudinal stability of the vehicle, the longitudinal stability of the vehicle can be maintained while securing the lateral stability of the vehicle when the rear wheels 19 go over the protruding portion T.

In this case, the lateral acceleration Gs or the rate of change in yaw rate Δω/Δt may be computed from the vehicle speed V and the steering angle θ1, or may be directly detected by a lateral acceleration sensor or a yaw rate gyroscope.

When the rate of change in yaw rate Δω/Δt is used as a detection value, swing restriction can be carried out at the beginning of a turn or when the forklift changes directions. This secures the lateral stability of the vehicle at the beginning of turning or when changing directions.

The swing restriction condition may one of the conditions for the load weight Ws, the lifted height Hs, the mast angle θ2 and the like, or may be a combination of these parameters. It is also possible not to perform swing restriction on the rear axle 16 based on the detection values corresponding to the turning state of the vehicle, such as the vehicle speed V, the steering angle θ1, the lateral acceleration Gs and the rate of change in yaw rate Δω/Δt.

To accurately detect the vehicle's gravitational center Pg on an inclined location, a tilt sensor may be provided on the mast so that the vehicle's gravitational center Pg in the longitudinal direction is detected based on the absolute tilt angle of the mast. This structure can ensure the longitudinal stability of the vehicle while securing the lateral stability of the vehicle, even when the rear wheels of the vehicle go over a bump on a sloped road.

The detection of the weight Ws need not be detected by a pressure sensor (the weight sensor 13) in correspondence with the hydraulic pressure of the lift cylinder 7 and may be rather be detected by using a load cell or pressure-sensitive conductive rubber. For a vehicle which carries a plurality of objects having a constant weight Ws, the presence or absence of the load may be detected instead of detecting the weight of the loads.

The means for detecting the lifted height Hs is not limited to a reel type sensor (height sensor 12), but may be an ultrasonic sensor which continuously detects the lifted height Hs. Further, a limit switch, a proximity switch, a photosensor or the like, which detects the lifted height step by step, may also be used.

Detection of the mast angle θ2 is not limited to the indirect detection of the rotation amount of the tilt cylinder by means of a potentiometer (mast angle sensor 13), a rotary encoder or the like, but may be carried out directly by means of a tilt sensor provided on the mast.

The electromagnetic control valve 28 may be a normally open type valve. In this case, the actuation of the hydraulic cylinder 22 is permitted when the electromagnetic control valve 28 due to a failure in the control unit 32. It is thus possible to allow the rear axle 16 to swing when swing control cannot be executed.

The present invention is not limited to a swing control apparatus of the type which restricts the swinging of the rear axle 16 by using a multiple action hydraulic cylinder 22 provided only on one side of the rear axle 16. The present invention may also be applied to a swing control apparatus which restricts the swinging of the rear axle 16 by using single action hydraulic cylinders provided on both sides of the rear axle 16.

The present invention is not limited to a forklift which employs double-tire front wheels, but may also be applied to a forklift which employs wide, single-tire front wheels. In this case, the stability of the vehicle is improved by the increased widths of the front wheels.

The present invention is not limited to a forklift and may be applied to any other type of industrial vehicle, such as a shovel loader having a swingable rear axle.

Therefore, the present examples and embodiment are to be considered as illustrative and not restrictive and the invention is not to be limited to the details given herein, but may be modified within the scope and equivalence of the appended claims.

What is claimed is:

1. An industrial vehicle for carrying a load, the industrial vehicle comprising:

a frame;

a pair of front wheels rotatably supported by the frame, each front wheel fitted with an outer tire and an inner tire;

a rear axle supported by the frame, wherein the rear axle is pivotal with respect to the frame;

a pair of rear wheels rotatably mounted on the rear axle;

a restriction apparatus for selectively permitting and restricting the pivotal motion of the rear axle in accordance with the state of the carried load;

a detecting device for detecting a center of gravity of the vehicle;

wherein the restriction apparatus permits the pivotal motion of the rear axle when the center of gravity is located within a predetermined zone.

2. The industrial vehicle according to claim 1, wherein the predetermined zone is defined to the rear of points where the front tires contact the ground and in between the inner tires.

3. The industrial vehicle according to claim 2, wherein the predetermined zone is defined within a rectangular area defined by points where the inner tires contact the ground and points where the rear wheels contact the ground.

4. The industrial vehicle according to claim 2, wherein the vehicle has a center line, the center line extending through a rear center point located between the contact points of the rear wheels and a front center point located between the contact points of the inner tires;

wherein the vehicle has a triangular area defined between the rear center point and points where the outer tires contact the ground;

wherein the center line includes a predetermined stable point that is defined by a first distance from the center line to an outer boundary of the triangular area and a second distance from the center line to an outer boundary of the rectangular area, the first and the second distances being equal to each other; and wherein the predetermined stable zone is located in front of the predetermined stable point.

5. The industrial vehicle according to claim 4, wherein the industrial vehicle includes a forklift, wherein the forklift has a fork for lifting a load and a mast for lifting and lowering the fork, wherein the mast is inclinable.

6. The industrial vehicle according to claim 5, wherein the detecting device includes:

a height sensor for detecting the height of the fork;

a weight sensor for detecting the weight of the load; and a mast angle sensor for detecting the inclination of the mast;

wherein the detection device estimates the center of gravity of the vehicle based on the height of the fork, the load weight, and the mast inclination.

7. The industrial vehicle according to claim 1, wherein the restriction apparatus comprises:

a cylinder for connecting the rear axle to the frame, the cylinder permitting the pivotal motion of the rear axle by expanding and contracting in correspondence to the pressure produced by hydraulic oil;

a conduit for supplying the oil to the cylinder;

a control valve connected to the conduit for selectively opening and closing the conduit; and a control unit for controlling the control valve, wherein the supply of the oil from the conduit to the cylinder is permitted when the conduit is opened, and wherein the supply of the oil is stopped when the conduit is closed.

8. The industrial vehicle according to claim 6 further comprising:

a speed sensor for detecting the speed of vehicle;

a wheel angle sensor for detecting a wheel angle of the rear wheels; and an operational unit for calculating a lateral acceleration applied to the vehicle and a yaw rate changing rate based on the speed of vehicle and the wheel angle.

9. The industrial vehicle according to claim 8 wherein the vehicle has a control unit, wherein the control unit determines whether the lateral acceleration is greater than a predetermined reference value, determines whether the yaw rate changing rate is greater that a predetermined reference value, and determines whether the center of gravity is within the predetermined zone, and wherein when the control unit determines that the center of gravity is within the predetermined zone, the control unit controls the restriction apparatus to restrict the pivotal motion of the rear axle based on the determination results with respect to the lateral acceleration and the yaw rate changing rate.

10. The industrial vehicle according to claim 9, wherein when the control unit determines that the center of gravity is not within the predetermined zone, the control unit determines whether the mast angle is greater that a predetermined reference value, and determines whether the load weight is greater than a predetermined reference value, wherein the control unit controls the restriction apparatus to restrict the pivotal motion of the rear axle based on the determination results with respect to the lateral acceleration, the yaw rate changing rate, the mast angle, and the load weight.

* * * * *

UNITED STATES PATENT AND TRADEMARK OFFICE
CERTIFICATE OF CORRECTION

PATENT NO. : 5,947,516
DATED : September 7, 1999
INVENTOR(S) : Kazuo Ishikawa

It is certified that error appears in the above-identified patent and that said Letters Patent is hereby corrected as shown below:

Column 14, line 25, change "that" to --than--.

Column 4, line 54, change "Hoof" to --HO of--.

Signed and Sealed this

Seventh Day of November, 2000

*Attest:*

Q. TODD DICKINSON

*Attesting Officer*  *Director of Patents and Trademarks*